Nov. 5, 1929.　　V. A. SMITH ET AL　　1,734,099
SIZING SAW
Filed July 15, 1924　　6 Sheets-Sheet 2

Fig. 2.

INVENTORS.
VERNON A. SMITH.
CHARLES BACKMAN.
BY
ATTORNEY

Nov. 5, 1929.  V. A. SMITH ET AL  1,734,099
SIZING SAW
Filed July 15, 1924  6 Sheets-Sheet 3

INVENTORS.
VERNON A. SMITH.
CHARLES BACKMAN.
BY
ATTORNEY

Nov. 5, 1929.  V. A. SMITH ET AL  1,734,099
SIZING SAW
Filed July 15, 1924   6 Sheets-Sheet 6

INVENTORS.
VERNON A. SMITH.
CHARLES BACKMAN.
BY
ATTORNEY

Patented Nov. 5, 1929

1,734,099

UNITED STATES PATENT OFFICE

VERNON A. SMITH, OF BERKELEY, AND CHARLES BACKMAN, OF OAKLAND, CALIFORNIA

SIZING SAW

Application filed July 15, 1924. Serial No. 726,099.

Our invention is an improved sizing machine particularly applicable for sizing blocks of wood.

The object of our invention is to provide a machine into which the wood is fed and conveyed through cutters which trim two edges of the block. The block is now automatically transferred to conveyors angularly positioned to the first conveyor, which conveys said block through cutters to trim the other two edges.

Another object of our invention is in the mechanical method for trimming blocks formed of a series of thin slabs in which the pile of slabs formed into a block is placed lengthwise on a carrier chain and is pressed by heavy rollers so as to hold all the slabs in close contact without relative movement and to carry the blocks through engaging saws to trim all the slabs on the side edges. The trimmed block is carried to a position adjacent the transverse endless belt carriers, the block being brought to rest actuates pushing devices which accelerate the speed of the blocks crosswise from zero to that of the cross conveyors. These cross conveyors being formed of endless belts bring a heavy pressure on the blocks and pass them through end cutting saws and in order to have both upper and lower conveying belts operating accurately, the upper belt is supported in tracks so as to form an even bearing for the blocks.

Our machine is especially designed to make thin wood slabs such as honey comb frames, pencil slabs, or other slabs of very thin material which must be trimmed accurately and particularly square to within very small limits.

To effect these objects there are a number of novel details such as pivoted arms to hold back a block until the block ahead is fed a sufficient distance. These arms also operate to strip off or remove an excess number of slabs if too many are positioned to make the block.

Another detail is in the mechanism for stopping the blocks in their longitudinal movement whereby the stopping of the blocks operate a trigger for starting the transverse pushers. These are so arranged to accelerate the blocks transversely from a zero speed to that of the cross conveyors, and to position them accurately in such conveyors. The trigger also operates a device which raises the upper cross conveyors so that the block may be properly inserted.

Another detail of our machine is the mechanism for moving the blocks or piles of thin pieces cross wise into the transverse conveyor so that all the separate pieces of the pile will remain in the same position in which the longitudinal sides were trimmed so that the transverse cuts for each piece or slab will be square to its side edges. Our machine is also designed to allow a variation of the spacing of the several transverse belts so that the blocks may be cut into different widths by the transverse saws.

Another object of our invention is to provide a machine of the character described, which is accurate, rapid and efficient in operation.

Other objects and advantages will be more fully described in the following detailed description.

In the annexed drawings, we have illustrated the preferred form of our invention, but it may also be embodied in other forms, and in this application we desire to cover our invention in whatever form it may be embodied.

Referring more particularly to the drawing, our machine consists of a suitable frame 1, over which the main conveyor chain 2 is adapted to travel. This chain travels the entire length of the machine and is mounted upon a sprocket wheel 3, journaled to the frame 1 at the forward end thereof, and over a sprocket wheel 4 mounted upon a shaft 5 which is journaled at the rear end of the frame. The shaft 5 is rotated by a main drive shaft 6 through gears 7 and 8, the drive shaft being driven by a motor 9 through a reducing gear by a belt 10 extending over pulleys on said shaft motor. The shaft 5 extends substantially the width of the machine and is journaled in suitable bearings secured to the frame 1.

A plurality of rollers 11 are journaled on rods 12 which are secured to the frame 1. These rollers are positioned above the chain 2 at intervals throughout its length, and are adapted to bear upon the top of the block to be sized, to hold it in position on said chain. The frame 1 is formed with a rail 13 over which the chain 2 passes to prevent it from sagging under the weight of the blocks and rollers 11.

A pair of saws 14 and 15 are positioned one on either side of the chain 2 and are mounted on the shaft of a motor 16 which is secured to the frame 1. Thus as the block of wood is conveyed past the saws 14 and 15 on the conveyor 2 the edges thereof are trimmed the desired amount. The blocks are now conveyed practically the entire length of the conveyor 2 before being transferred to the cross conveyor 17.

The cross conveyor is preferably positioned at right angles to the conveyor 2 and consists of a plurality of super-imposed pairs of chains 18 and 19. The lower chains 19 extend over sprockets 20 journaled on the frame 1 and over sprockets 21 secured to the drive shaft 6, and suitable means are provided for lateral adjustment and alignment.

A plate 22 is positioned under the upper reach of the chain 19 and is adapted to support said reach to prevent sagging thereof. The chains 18 are mounted on frames 23 which are journaled on a shaft 24. Said shaft is journaled in suitable bearings secured to the frame 1 and extends the length of the machine directly over the shaft 6. The shaft 24 is driven from the shaft 6 through gears 25 thereon.

Figure 1:
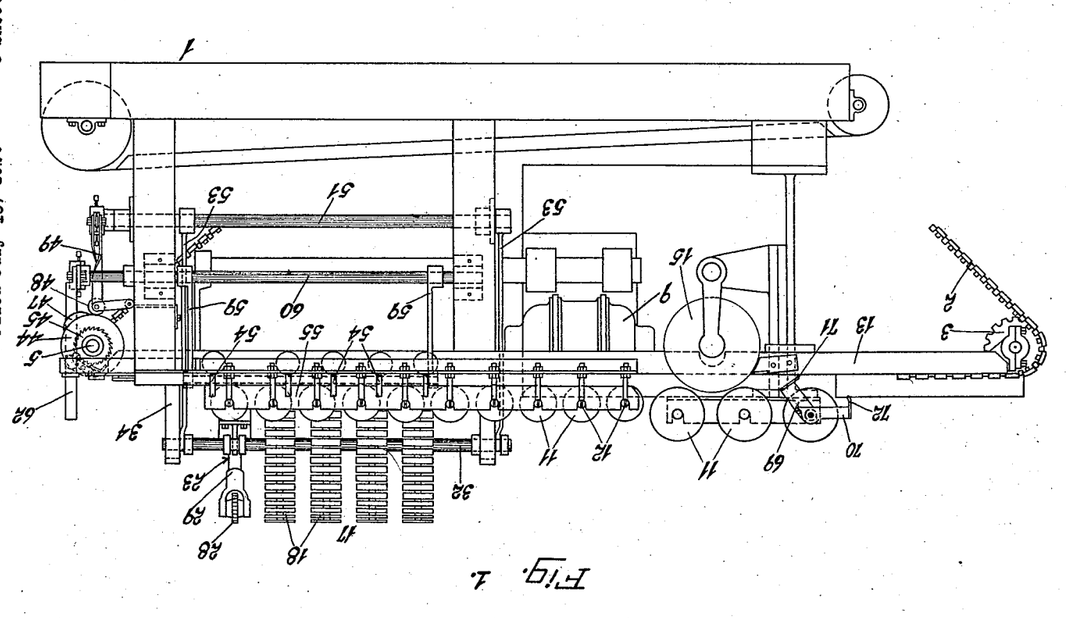
Figure 1 is a side elevation of our machine.
Figure 2:
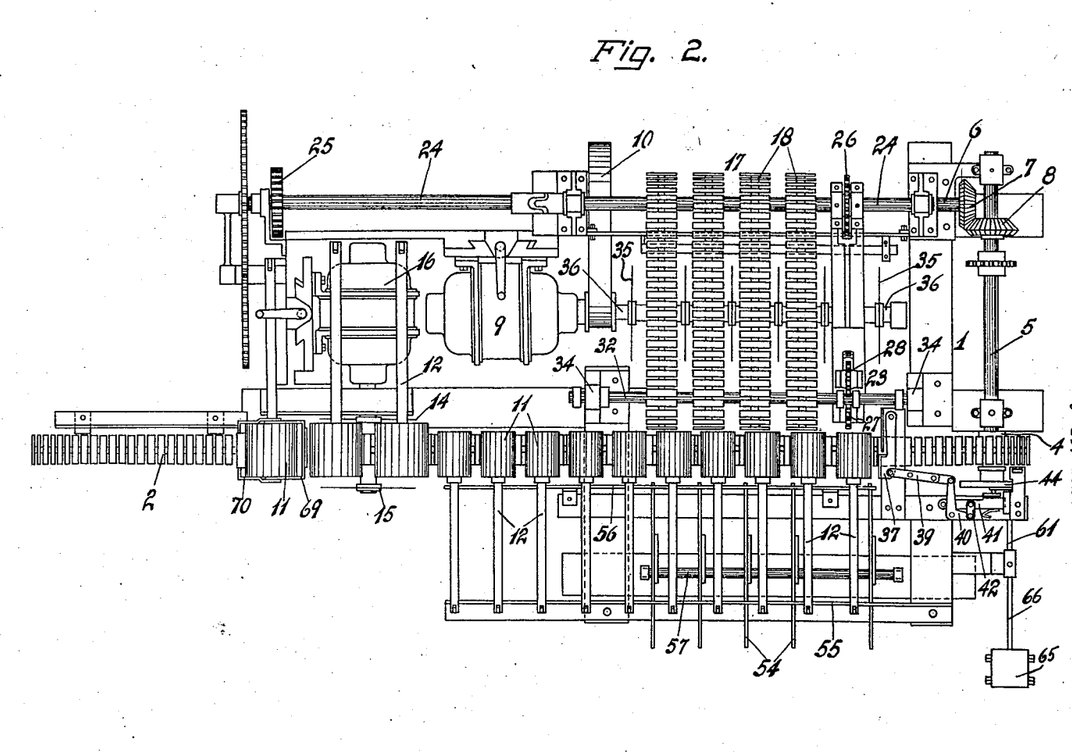
Figure 2 is a plan view of the same.
Figure 3:
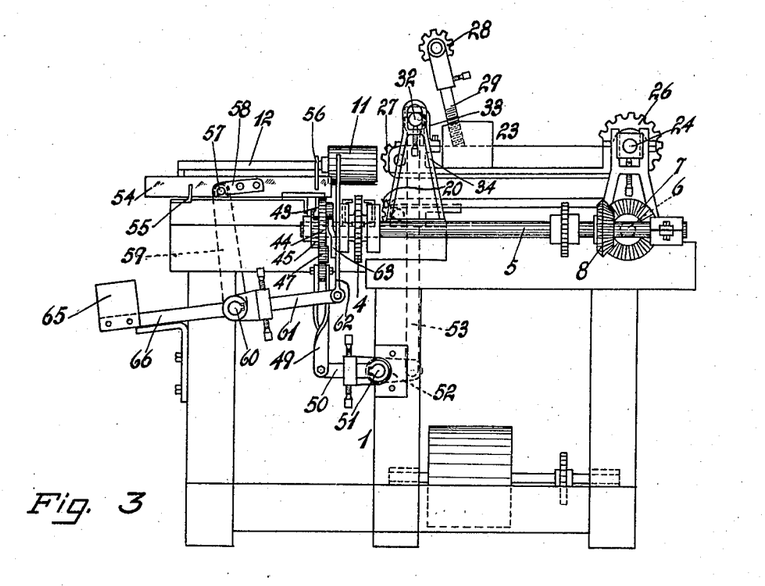
Figure 3 is an end elevation.
Figure 4:
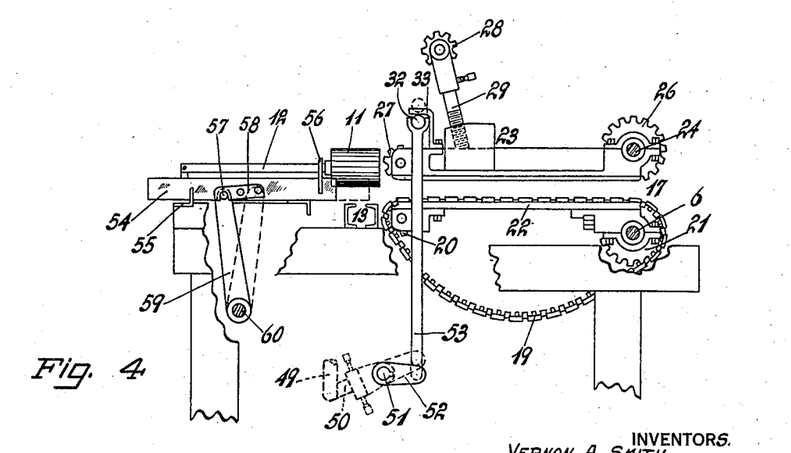
Figure 4 is an end elevation with parts broken away to show the construction.

The chains 18 extend over sprockets 26 secured to the shaft 24, sprockets 27 journaled in the forward end of the frame 23, and sprockets 28 journaled on posts 29 which are threaded in the frame 23. Thus, the chains 18 may be tightened by raising the posts 29. To prevent sagging of the lower reach of the chains 18, a channel 30 in Fig. 1 is formed in the bottom of the frame 23, and fingers 31—31 are formed on the links of the chain and enter said channel thus holding the chain close to the frame. The frames 23 are adjustably mounted for lateral movement on the shafts 24 and 32.

The forward end of the frame 23 is supported on a rod 32 by fingers 33 hooked over the rod. Said rod is supported in guides 34—34 in which a vertical movement is permitted as will be further described. Saws 35 are mounted on the shaft 36 of the motor 9 and are positioned adjacent the conveyors 18 and 19 to trim the ends of the block as it is conveyed by the chains.

Figure 5:
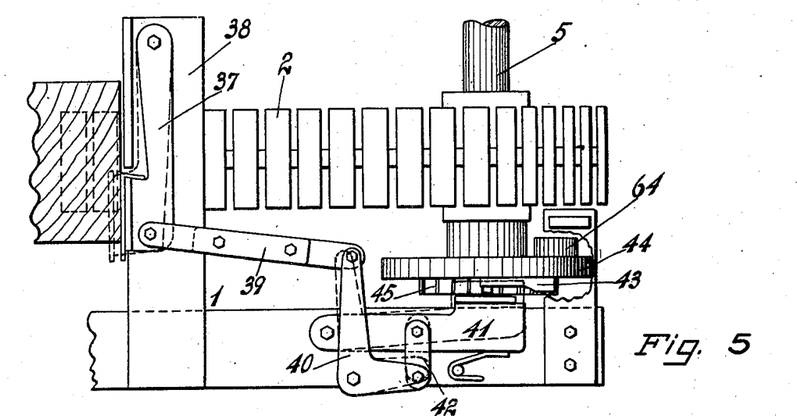
Figure 5 is an enlarged plan view of the cross feed control.
Figure 6:
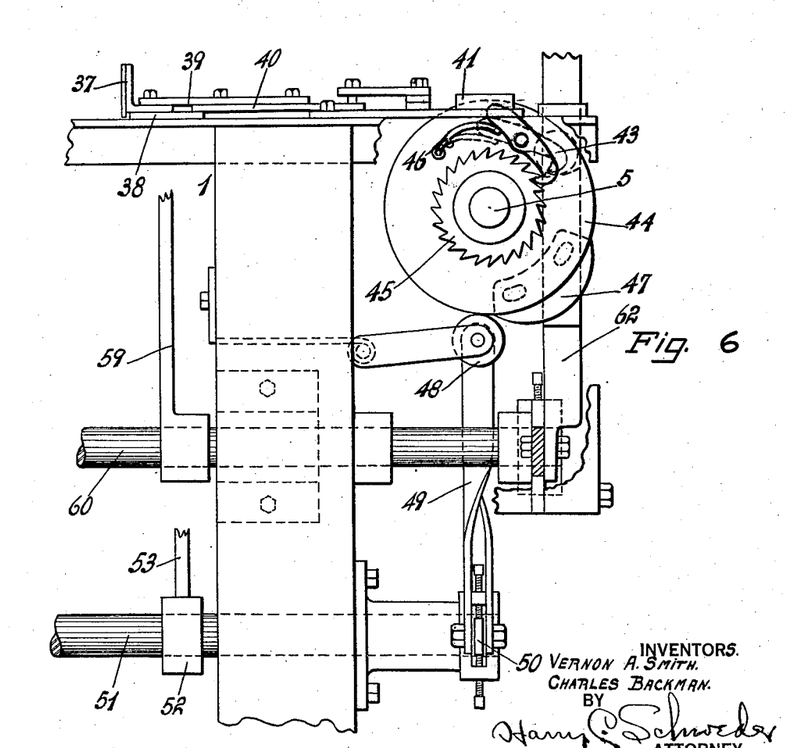
Figure 6 is a fragmentary side view of the same.
Figure 7:
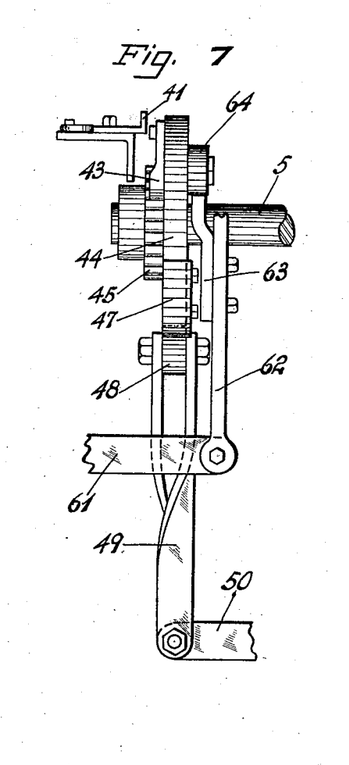
Figure 7 is an end view of the cross feed control.
Figure 8:
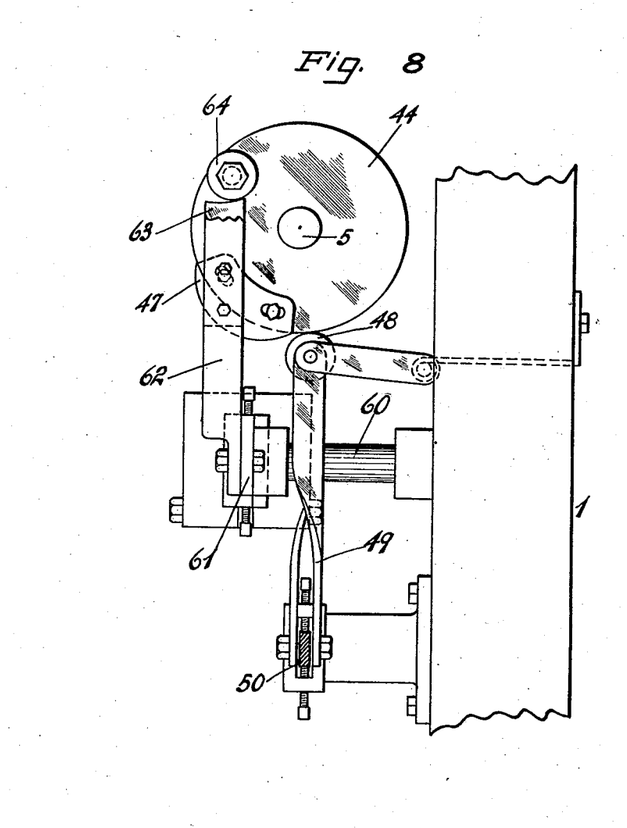
Figure 8 is a rear view of the same.
Figure 9:
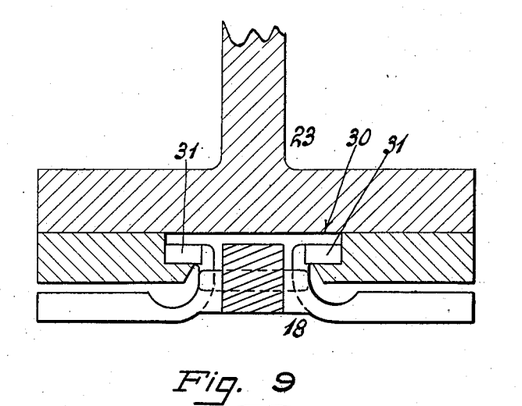
Figure 9 is a fragmentary sectional view of the conveyor chain.

The block after traversing the length of the chain 2 is automatically transferred to the cross conveyors 18 and 19 which will now be described. As seen in Figure 5 the block is carried by the chain 2 against a trigger 37, which is pivoted to a plate 38 extending over the chain 2. A link 39 is pivoted to the trigger 37 and to a bell crank lever 40, which is pivoted to the frame 1. A locking bar 41 is pivoted to the frame 1 adjacent the bell crank 40 and is joined thereto by a link 42. Thus it is evident that when the trigger 37 is moved inwardly the bar 41 will move outwardly, and free a dog 43 which is pivoted to a wheel 44 journaled on the shaft 5. A ratchet wheel 45 is secured to the shaft 5 adjacent the wheel 44, and a spring 46 urges the dog 43 into engagement with said ratchet wheel, thus dragging the wheel 44 around until it is released by the dog again engaging the lower surface of the bar 41, which pulls it out of engagement with the ratchet wheel. A cam 47 is adjustably mounted on the edge of the wheel 44 and engages a roller 48 on an arm 49 and depresses said arm and swings a lever 50 to which it is pivoted. Thus by adjusting the cam the time of movement of the lever 50 is determined. This lever 50 is keyed to a shaft 51, which shaft is journaled in the frame 1 and is rocked by the swinging of the lever 50.

Arms 52—52 at the ends of the shaft 51 are keyed thereto and are pivoted to links 53—53 which engage the shaft 32 at either end. Thus as the shaft 51 is rocked the shaft 32 is raised which raises the frames 23, and permits the blocks to be accurately positioned between the chains 18 and 19 before being engaged by them. As soon as the cam 47 passes the roller 48 the frames 23 drop and engage the block to convey it against the saws 35. The movement of the block from the chain 2 to the cross conveyor 17 is accomplished by means of pusher plates 54, which operate through guides 55 and 56 on the frame 1. The plates are each linked to a bar 57 by links 58, and the bar is reciprocated by a pair of arms 59—59 secured thereto and to a shaft 60 journaled in the frame 1. The links 58 may be adjusted on the plates 54 by any suitable means thus adjusting and timing said plates with relation to the cross conveyor 17.

The shaft 60 is rocked by a bar 61 secured to the end thereof. This bar has a plate 62 pivoted to the end thereof and extending upwardly adjacent the wheel 44. A lug 63 on the plate 62 is engaged by a roller 64 on the wheel 44, which in its rotation depresses the plate, and actuates the arm 61 to rock the shaft 60. A counter weight 65 is secured to an arm 66 which is secured to the shaft 60, thus the shaft is returned to its original position along with the pusher plates 54 after the roller 64 leaves the lug 63.

Figure 10:
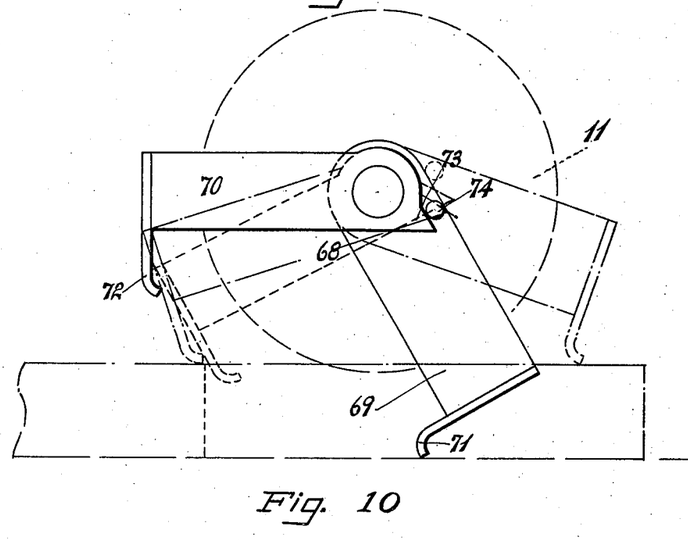
Figure 10 is an enlarged side view of the feed control gate.

When the blocks strike the trigger 37 they are detained for a short interval, therefore it is necessary to space them apart on the chain 2. We accomplish this by means of a gate 68, which consists of two arms 69 and 70 journaled on the shaft of the first roller 11. Each of the arms 69 and 70 has shoes 71 and 72 respectively formed on the end thereof, which contact with the blocks. The arm 69 is counterweighted and normally hangs downwardly adjacent the chain 2. The arm 70 is held in a raised position by a finger 73 thereon engaging a pin 74 on the arm 69. Thus as a block is moved along the chain 2 it engages the shoe 71 and raises the arm 69, and allowing the arm 70 to swing down behind it. The shoe 72 slides on the block in a position shown in dash and dotted lines in Figure 1. After the end of the block passes, the shoe 72 slides down the end thereof between the adjacent blocks. The next block engages the shoe 72, as shown in dotted line in Figure 10, until the previous block has passed the arm 69, when said arm drops raising arm 70 and permitting the next block to move forwardly. The blocks are thus spaced the proper amount.

From the above description it will be apparent that our mechanical method of trimming blocks (which may be of solid wood or a series of thin slabs piled up to form a block) comprises in brief moving the blocks on an endless carrier and pressing heavily on the top of the blocks so as to retain them accurately in position, trimming the longitudinal sides by saws as the blocks pass along, having the blocks themselves accurate, a tripping device which separates transverse conveyor belts and then moving the blocks sideways with an accelerating motion from zero to the speed of the transverse conveyors and clamping a block between upper and lower transverse conveyors under pressure so as to hold the block true while it is cut into short sections.

Our machine has been designed for accurate work in trimming to definite dimensions within close limits and in particular for feeding the blocks to the cross cutting saws so that the sides and cross edges will be square to within very close limits.

Having described our invention, we claim:

1. A sizing machine comprising a conveyor, cutters adjacent said conveyor, a cross conveyor positioned at an angle to said first named conveyor, cutters adjacent said cross conveyor, and transfer means adapted to act upon the work to move it from the first conveyor to the cross conveyor, said cross conveyor comprising a plurality of pairs of super-imposed conveyors, and means to separate said conveyor pairs prior to the transfer.

2. A sizing machine comprising a conveyor, cutters adjacent said conveyor, a cross conveyor positioned at an angle to said first named conveyor, cutters adjacent said cross conveyor, and transfer means adapted to act upon the work to move it from the first conveyor to the cross conveyor, said cross conveyor comprising a plurality of pairs of super-imposed conveyors, and means to separate said conveyor pairs prior to the transfer, pusher plates adjacent said conveyor, arms secured to said plates, a disc, means to rotate said disc, control means for said disc, means joining said disc and said arms, whereby said arms are reciprocated, and means joining said disc and said separating means to actuate said separating means.

3. A sizing machine comprising in combination a longitudinal conveyor adapted to carry blocks, a series of rollers mounted above the conveyor adapted to exert pressure on the said blocks, trimming saws to trim the longitudinal sides of the block, a cross conveyor comprising upper and lower endless belts, means to arrest the longitudinal movement of the block on the longitudinal conveyor and means actuated by the arresting device to elevate the upper cross conveyor belt to allow insertion of the block, and means to cut the block when carried by the cross conveyors.

4. A sizing machine, as claimed in claim 3 having in addition a gate to space the blocks on the longitudinal conveyor, said gate comprising a pair of pivoted arms and means to operate one arm by the movement of the other arm.

5. In a sizing machine of the character described, a conveyor and a gate positioned above the same and comprising forwardly and backwardly extending arms, a pivotal connection for said arms and means to allow the backwardly extending arm to rest on a block as it is being fed by the conveyor and the forwardly extending arm being positioned to block an approaching block, said backwardly extending arm being adapted to pivot downwardly by its own gravity after a block is passed thereunder and means on said rearwardly extending arm to engage and to raise the forwardly extending arm so as to allow passage of another block, after the backwardly extending arm is lowered.

6. A trimming machine comprising in combination a longitudinal conveyor, a plurality of rollers positioned above said conveyor and adapted to bear upon a block, trimming saws to cut the longitudinal sides of a block, a series of cross conveyors having opposed conveyor belts adapted to open and close for receiving and gripping a block, means to arrest the movement of the block opposite the cross conveyors, means actuated by the arresting means to move the block from the longitudinal to cross conveyors, said means accelerating the speed from zero to that of the cross conveyors and saws to cut transversely of the blocks.

7. In a sizing machine of the character described, a first set of cutters, a conveyor adapted to advance an object thereon to said first set of cutters, a second set of cutters, a transverse conveyor advancing the object thereon to said second set of cutters, said transverse conveyor comprising two elements mounted for opening and closing movements, operating means for opening the transverse conveyor for receiving the object, and means for pushing the work from the longitudinal conveyor to the transverse conveyor.

8. In a sizing machine of the character described, a conveyor adapted to advance an object thereon, a set of cutters, a transverse conveyor comprising two elements mounted for opening and closing movements, a second set of cutters disposed in operative relation to said transverse conveyor; operating means for opening the transverse conveyor for receiving the object; means pushing the object from the first conveyor to the transverse conveyor, whereby said object is carried past the second set of cutters; and means actuated by the advancing object rendering the said operating means active.

9. In a sizing machine of the character described, a conveyor adapted to advance an object thereon; a set of cutters, said conveyor carrying said object past said set of cutters; a plurality of transverse conveyors, each comprising two elements mounted for opening and closing movements; a second set of cutters disposed in operative relation to said transverse conveyor; operating means for simultaneously opening all the transverse conveyors for receiving the object; and means pushing the object from the first conveyor to the transverse conveyor, whereby said object is carried past said second set of cutters.

10. In a sizing machine of the character described, a conveyor adapted to advance an object thereon; a first set of cutters, said conveyor carrying said object past said set of cutters; a plurality of transverse conveyors, each comprising two elements mounted for opening and closing movement; a second set of cutters disposed in operative relation to said transverse conveyor; operating means for simultaneously opening all the transverse conveyors for receiving the object; means pushing the object from the first conveyor to the transverse conveyor; and means actuated by the advancing object, rendering the said operating means active.

11. In a sizing machine of the character described, a conveyor adapted to advance an object thereon; a set of cutters, said conveyor carrying said object past said set of cutters; a transverse conveyor comprising two elements mounted for opening and closing movement; a second set of cutters disposed in operative relation to said transverse conveyor; means for pushing the object toward the transverse conveyor; means for opening the latter; and means actuating both of the said means in timed relation.

12. In a sizing machine of the character described, a conveyor adapted to advance an object thereon; a set of cutters, said conveyor carrying said object past said set of cutters; a transverse conveyor comprising two elements mounted for opening and closing movement; a second set of cutters disposed in operative relation to said transverse conveyor; means for pushing the object toward the transverse conveyor; means for opening the latter; and means actuating both of the said means in timed relation, said last actuating means being arranged for operation by the advancing object.

13. In a sizing machine of the character described, a first set of saws; a conveyor carrying an object past said set of saws; opposed cross conveyors adapted to open and close for receiving and gripping an object; a feed mechanism to transfer the object from the first conveyor to the cross conveyors; means to operate said feed mechanism and to open said opposed conveyors in timed relation; and a second set of saws for trimming the object carried by said opposed cross conveyors.

14. In a sizing machine of the character described, a first set of saws; a conveyor carrying an object past said set of saws; opposed cross conveyors adapted to open and close for receiving and gripping an object; a feed mechanism to transfer the object from the first conveyor to the cross conveyors; means to operate said feed mechanism and to open said opposed conveyors in timed relation; and a second set of saws for trimming the object carried by said opposed cross conveyors, said operating means being arranged to be actuated by the object carried by said first conveyor.

15. In a sizing machine of the character described, a first set of saws; a conveyor carrying an object past said set of saws; opposed cross conveyors adapted to open and close for receiving and gripping an object; a feed mechanism to transfer the object from the first conveyor to the cross conveyors; means to arrest the movement of said object opposite said feed mechanism; means actuated by said arresting means to operate said feed mechanism and open said opposed conveyors in timed relation; and a second set of saws for trimming the object carried by said opposed cross conveyors.

16. In a sizing machine of the character described, a first set of saws; a conveyor carrying an object past said set of saws; opposed cross conveyors adapted to open and close for receiving and gripping an object; a feed mechanism to transfer the object from the first conveyor to the cross conveyors; means to arrest the movement of said object opposite said feed mechanism; means actuated by said arresting means, when acted upon by the object, to operate said feed mechanism and open said opposed conveyors in timed relation; and a second set of saws for trimming the object carried by said opposed cross conveyors.

17. In a sizing machine of the character described, a conveyor, sets of saws for trimming the work carried by the conveyor; opposed cross conveyors; means to open and close said opposed conveyors for receiving and gripping said work; and L-feed mechanism for transferring the work from the first conveyor to the opposed conveyors; a work-controlled trip for actuating said cross conveyor opening means and said L-feed mechanism in timed relation; and a second set of saws for trimming the work carried by the cross conveyors.

18. In a sizing machine of the character described, a conveyor adapted to advance an object thereon and a transverse conveyor comprising coacting elements mounted to part for allowing the object to enter therebetween and to grip the object thereafter and operating means effecting the parting and gripping movements, said operating means being actuated by the work, sets of saws for trimming said objects, said conveyors carrying the object past said sets of saws.

In testimony whereof we affix our signatures.

VERNON A. SMITH.
CHARLES BACKMAN.